(12) United States Patent
Sumiya et al.

(10) Patent No.: US 7,482,915 B2
(45) Date of Patent: Jan. 27, 2009

(54) VEHICULAR DISPLAY DEVICE

(75) Inventors: Minoru Sumiya, Nagoya (JP); Shoji Kurikawa, Chiryu (JP); Yoshinori Araki, Kariya (JP); Yutaka Imai, Toyota (JP); Yoshiyuki Muramatsu, Aichi-gun (JP)

(73) Assignees: DENSO CORPORATION, Kariya (JP); Toyota Jidosha Kabushiki Kaisha, Aichi-pref. (JP)

( * ) Notice: Subject to any disclaimer, the term of this patent is extended or adjusted under 35 U.S.C. 154(b) by 324 days.

(21) Appl. No.: 11/511,240

(22) Filed: Aug. 29, 2006

(65) Prior Publication Data

US 2006/0290486 A1 Dec. 28, 2006

Related U.S. Application Data

(63) Continuation of application No. PCT/JP2005/003958, filed on Mar. 8, 2005.

(30) Foreign Application Priority Data

Mar. 9, 2004 (JP) ............................. 2004-066139
Mar. 25, 2004 (JP) ............................. 2004-089763

(51) Int. Cl.
   *B60Q 1/00* (2006.01)
(52) U.S. Cl. ................................... 340/461
(58) Field of Classification Search ............... 340/461, 340/441, 438, 463, 483, 691.1, 815.55, 815.74; 362/23, 471, 489; 345/102
   See application file for complete search history.

(56) References Cited

U.S. PATENT DOCUMENTS

| 7,357,096 B2* | 4/2008 | Tane ............................ 116/288 |
| 2005/0109261 A1* | 5/2005 | Tanaka et al. ............... 116/300 |
| 2005/0268839 A1* | 12/2005 | Araki et al. .................. 116/288 |
| 2006/0018109 A1* | 1/2006 | Kageyama et al. ............ 362/23 |

(Continued)

FOREIGN PATENT DOCUMENTS

DE 197 57 545 A1 6/1998

(Continued)

OTHER PUBLICATIONS

Office Action dated Dec. 28, 2007 in corresponding Chinese Patent Application No. 2005 8000 7709.3 (and English translation).

(Continued)

*Primary Examiner*—Phung Nguyen
(74) *Attorney, Agent, or Firm*—Posz Law Group, PLC (57) ABSTRACT

A center panel is closer to a viewer in the viewing direction than a speedometer A is and overlapped with the speedometer. The center panel includes an attachment portion extending from a rear side of the center panel towards a dial plate of the speedometer. The center panel is fixed to a printed circuit board of the speedometer via the attachment portion. Accordingly, when a combination meter is viewed, the attachment portion is concealed rearward of the center panel to be invisible. The center panel looks floating separately from the speedometer towards a viewer, which provides a combination meter having excellent visibility and aesthetic cosmetic appearance. Thus, a vehicular display device having excellent visibility and aesthetic cosmetic appearance can be provided by improving a method for supporting a displaying unit on a pointer instrument.

9 Claims, 10 Drawing Sheets

U.S. PATENT DOCUMENTS

2007/0063921 A1* 3/2007 Harada et al. ............... 345/1.1

FOREIGN PATENT DOCUMENTS

| GB | 2 305 154 A | 4/1997 |
| --- | --- | --- |
| JP | A-62-265586 | 11/1987 |
| JP | A-02-302720 | 12/1990 |
| JP | U-H03-95990 | 9/1991 |
| JP | A-04-223222 | 8/1992 |
| JP | A-05-112160 | 5/1993 |
| JP | H6-Y2-796 | 1/1994 |
| JP | A-2002-039807 | 2/2002 |
| JP | A-2003-294499 | 10/2003 |
| JP | A-2003-315106 | 11/2003 |

OTHER PUBLICATIONS

Supplemental European Search Report dated Mar. 13, 2008 in corresponding European Patent Application No. 05720230.1-1236.

Office Action dated Mar. 4, 2008 in corresponding Japanese Patent Application No. 2004-066139 (and English translation).

Office Action dated Mar. 4, 2008 in corresponding Japanese Patent Application No. 2004-089763 (and English translation).

International Search Report (with English Outline) dated Jun. 21, 2005.

* cited by examiner

VEHICULAR DISPLAY DEVICE

CROSS REFERENCE TO RELATED APPLICATION

This application is a continuation of an international patent application No. PCT/JP2005/3958 filed on Mar. 8, 2005 designating the United States of America, and is based on Japanese Patent Applications No. 2004-66139 filed on Mar. 9, 2004 and No. 2004-89763 filed on Mar. 25, 2004, the contents of which are incorporated herein by reference in its entirety.

FIELD OF THE INVENTION

The present invention relates to a vehicular display device around a driver's seat to display a variety of information to a driver.

BACKGROUND OF THE INVENTION

Recently, the number of information items displayed in a vehicular display device has increased. The number of components, such as an air-conditioner or an airbag, installed in a dashboard has also increased, in addition to the display device. Therefore, the display device is required to become smaller.

Thus, the display device needs to simultaneously achieve two requirements of increasing the number of information items or kinds to display and of becoming small; the two requirements conflict with each other.

To achieve these requirements, Patent Document 1 discloses a display device that includes a pointer instrument and a displaying unit, which displays given information to a viewer. At least pointer's tip portion of the pointer instrument is exposed outside of the displaying unit, i.e., a part of the pointer is visible outside of an outer circumference of the displaying unit.

Patent Document 1: JP-2003-294499 A

This display device effectively uses an inward area of the viewer-side surface of the pointer instrument. This inward area is not conventionally used to install anything.

In this display device, the displaying unit overlaps with the pointer instrument in a viewing direction from the viewer. The displaying unit looks protruding from a connection portion between the pointer instrument and the viewer to not prevent the pointer from rotating. The connection portion is used for the displaying unit to fix to the pointer instrument. The connection portion is part of the outer circumference of the displaying unit. The connection portion extends in approximately parallel with a dial plate of the pointer instrument.

Thus, the display unit does not look separated from the pointer instrument when the viewer sees the vehicular display device. The connection portion, by which the displaying unit is fixed to the pointer instrument, is very clearly seen from the viewer.

This involves a problem that the vehicular display device lacks aesthetic cosmetic appearance.

SUMMARY OF THE INVENTION

It is an object of the present invention to provide a vehicular display device having high excellent visibility and aesthetic cosmetic appearance by improving a supporting method in consideration of the problem.

A vehicular display device according to an aspect of the present invention is provided as follows. A pointer instrument is comprised to include a dial plate having a display design and a pointer that rotates over the dial plate. A displaying unit is comprised to be closer to a viewer than the pointer instrument is in a viewing direction and overlapped with the pointer instrument, wherein a portion of the pointer of the pointer instrument and the display design are visible outside of the displaying unit. The displaying unit includes a light source and a supporting portion, which extends towards the pointer instrument rearward of the displaying unit. The displaying unit is supported and fixed to the pointer instrument via the supporting portion.

Under this structure, when a viewer sees the vehicular display device, the supporting unit used to fix the displaying unit is concealed rearward of the displaying unit and cannot be seen.

This allows the displaying unit to look floating thoroughly separately from the pointer instrument, and provides the vehicular display device having excellent visibility and aesthetic cosmetic appearance.

A vehicular display device according to another aspect of the present invention is provided as follows. A pointer instrument is comprised to include a dial plate having a display design and a pointer that rotates over the dial plate. A displaying unit is comprised to be closer to a viewer than the pointer instrument is in a viewing direction and overlapped with the pointer instrument, wherein the displaying unit includes a light source, wherein a portion of the pointer of the pointer instrument and the display design are visible outside of the displaying unit. A supporting unit is comprised to be formed of translucent translucent material and to be closer to the viewer in the viewing direction than the dial plate is. The displaying unit is supported and fixed to the pointer instrument via the supporting unit.

The supporting unit supports an outer circumference of the displaying unit. This structure fixes the displaying unit to the pointer instrument. The supporting unit is formed of translucent material or transparent material.

Accordingly, when a viewer sees the vehicular display device, only an outline of the displaying unit is visible while the pointer and display design can be visible via the transparent supporting unit.

This allows the displaying unit to look floating thoroughly separately from the pointer instrument, and provides the vehicular display device having excellent visibility and aesthetic cosmetic appearance.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
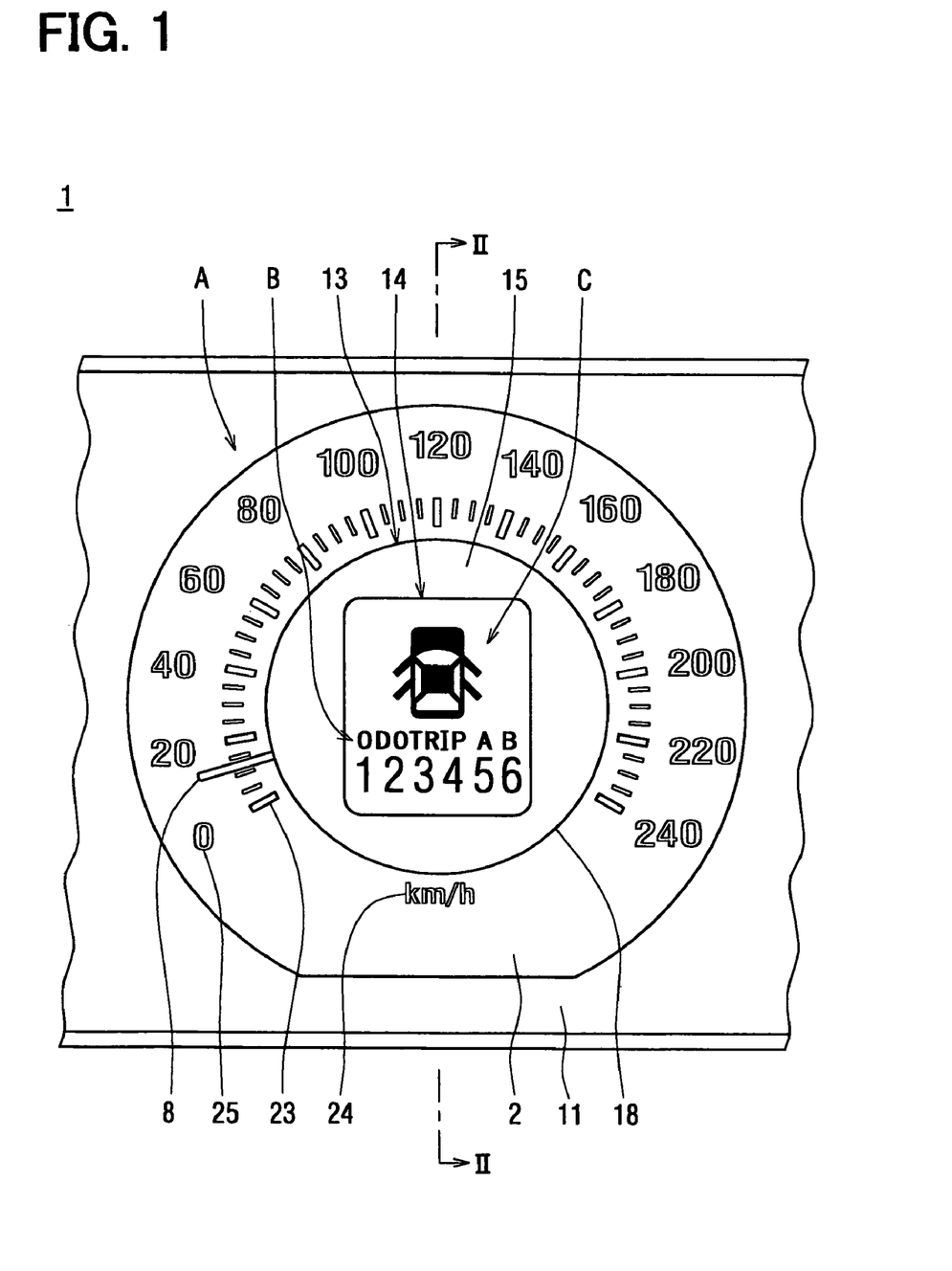
FIG. 1 is a partial front view of a combination meter according to a first embodiment of the present invention.
Figure 2:
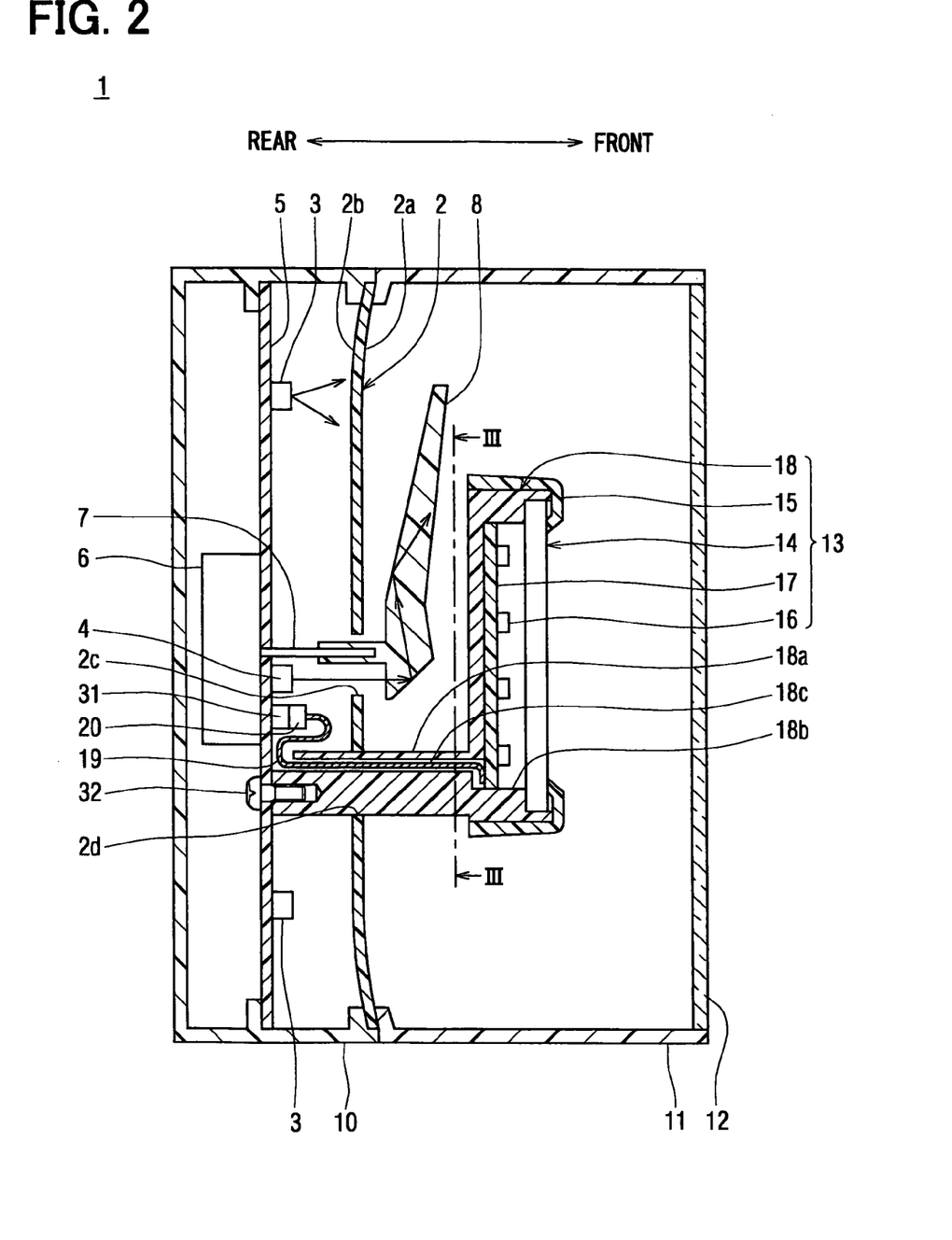
FIG. 2 is a cross-sectional view taken from line II-II in FIG. 1 according to the first embodiment.
Figure 3:
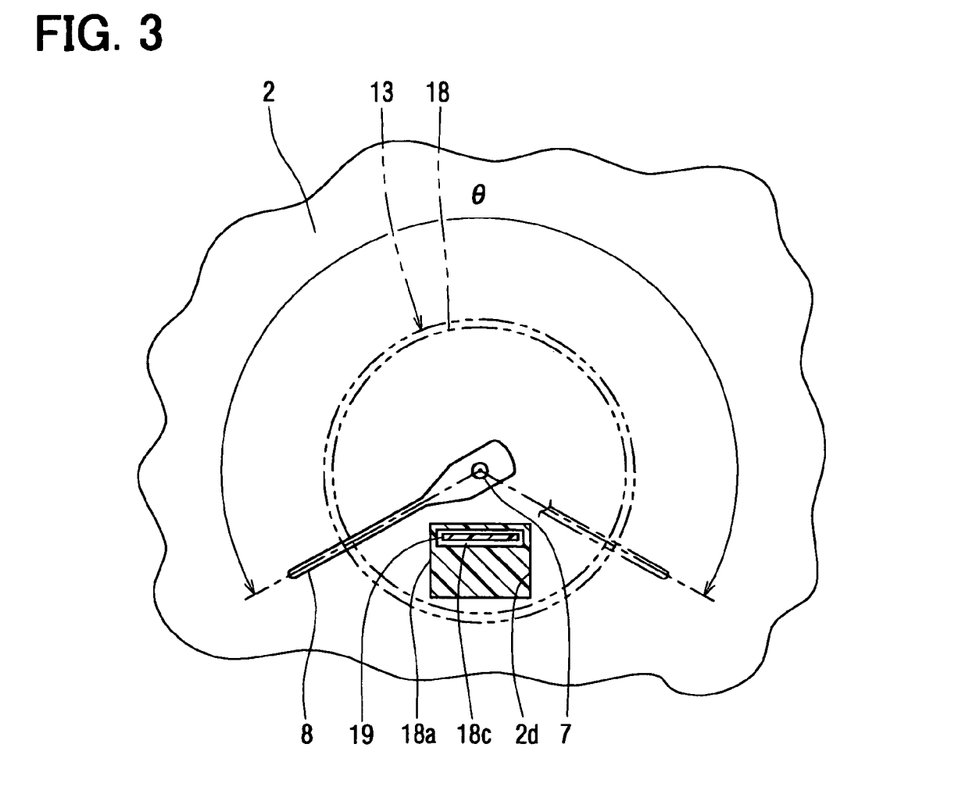
FIG. 3 is a view illustrating an internal surface of the combination meter according to the first embodiment.
Figure 4:
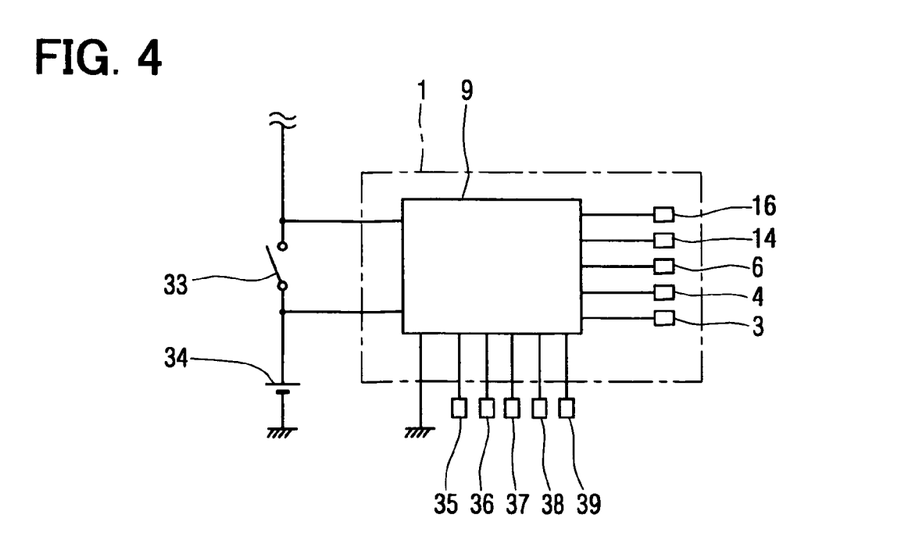
FIG. 4 is a diagram illustrating a structure of an electrical circuit of the combination meter according to the first embodiment.

FIG. 1 is a partial front view of a combination meter 1 according to a first embodiment of the present invention. FIG. 2 is a cross-sectional view taken from line II-II in FIG. 1. In FIG. 2, the right side faces a driver's seat, from which the combination meter 1 is visible. FIG. 3 is a view illustrating an internal surface of the combination meter 1. In FIG. 3, scales 23, characters 24, and numerals 25 are eliminated for easy understanding. FIG. 4 is a diagram illustrating a structure of an electrical circuit of the combination meter 1.

The combination meter 1 is mounted in a vehicle such that a driver in a driver's seat can view the combination meter 1. The combination meter 1 displays a variety of information relating to the vehicle. The combination meter 1 includes a speedometer A that indicates a traveling speed of the vehicle, a distance meter B that indicates an accumulated traveling distance and an interval traveling distance, and a door indicator C that indicates opening and closing states of the doors of the vehicle.

The speedometer A will be explained below.

The speedometer A is a pointer instrument that indicates a speed by a rotational angle of a pointer 8. The speedometer A includes a dial plate 2 to enable the driver to notice the rotational position of the pointer 8.

The dial plate 2 is formed of translucent material such as a clear thin plate made of polycarbonate. The dial plate 2 has a display design of scales 23, characters 24, and numerals 25, as shown in FIG. 1. The scales 23, the characters 24, and the numerals 25 are formed by printing or hot-stamping either on a front surface 2a (right-side surface in FIG. 2) or on a rear surface 2b (left-side surface in FIG. 2) of the dial plate 2. Non-translucent or semi-translucent colorant is applied to areas other than the scales 23, the characters 24, and the numerals 25, while semi-translucent colorant or no colorant is applied to the scales 23, the characters 24, and the numerals 25. In the first embodiment, semi-translucent yellow colorant is applied to the scales 23, the characters 24, and the numerals 25; semi-translucent dark blue colorant is applied to other areas. Under this coloring structure, light emitting diodes 3 located backward of the dial plate 2 transparently illuminate the dial plate 2 to luminiferously indicate the scales 23, the characters 24, and the numerals 25 in yellow within the dark-blue background. The scales 23 and the numerals 25 indicate the vehicle speed using the pointer 8 (explained later), and are disposed coaxially with a pointer shaft 7 in individual circular arcs. The dial plate 2 includes a through-hole 2c as shown in FIG. 2. This through-hole 2c is used for the pointer shaft 7 of the movement 6 to protrude the dial plate 2 from the rear side (left side in FIG. 2) to the front side (right side in FIG. 2).

A printed circuit board 5 is disposed rearward (leftward in FIG. 2) of the dial plate 2. The printed circuit board 5 is a glass-epoxy board or the like to constitute an electrical circuit of the combination meter 1. The light emitting diodes 3 and light emitting diode 4 are mounted on the printed circuit board 5 for transparently illuminating the dial plate 2 and the pointer 8, respectively. In this embodiment, the light emitting diodes 3, 4 are white light emitting diodes.

Further, the movement 6 is mounted on the printed circuit board 5. The movement 6 is a stepping motor or an electric actuator such as a cross-coil rotating machine to rotate the pointer shaft 7 by an angle corresponding to an electrical signal from outside (in the first embodiment, a signal of the vehicle speed). The pointer shaft 7 of the movement 6 protruding towards frontward of the dial plate 2 fixes the pointer 8 in its tip end. The pointer 8 is formed of translucent material such as acrylic resin such that the pointer 8 is luminiferously displayed by lights from the light emitting diode 4 mounted on the printed circuit board 5. Thus a speed of the vehicle is indicated by the pointer 8 and the display design including the scales 23, characters 24, and numerals 25 on the dial plate 2.

Further, a controller 9 is mounted on the printed circuit board 5 to control lighting up or off the light emitting diodes 3, 4 and driving the movement 6. The controller 9 is a CPU or the like.

The above-described dial plate 2, the printed circuit board 5, or the like are contained within a casing 10 made of resin material, as shown in FIG. 2.

A rim plate 11 having a frame shape is disposed frontward of the dial plate 2; further, a clear cover 12 is attached to the front end of the rim plate 11. For instance, the rim plate 11 is formed of resin material; the clear cover 12 is formed of a clear resin thin plate or glass. The rim plate 11 and the clear cover 12 improve cosmetic appearance of the combination meter 1, and prevent moisture or dust from entering inside of the combination meter 1.

Next, the distance meter B and the door indicator C, or a center panel 13 including the distance meter B and the door indicator C will be explained below.

The distance meter B and the door indicator C are formed over the center panel 13 functioning as a displaying unit. The center panel 13 is closer (rightward in FIG. 2) to the viewer than the speedometer A is. The center panel 13 and the speedometer A are seen to overlap with each other in the viewing direction (horizontal direction in FIG. 2). The distance meter B and the door indicator C are formed as display images over a liquid crystal panel 14 of a liquid crystal indicator included in the center panel 13, as shown in FIG. 1.

Rearward (leftward in FIG. 2) of the liquid crystal panel 14, several light emitting diodes 16 as a backlight for transparently illuminating the liquid crystal panel 14 are disposed, as shown in FIG. 2. The light emitting diodes 16 are mounted on a printed circuit board 17, as shown in FIG. 2. The liquid crystal panel 14 is electrically coupled with the printed circuit board 17. The printed circuit board 17 is electrically coupled with the printed circuit board 5 via a flexible printed circuit board 19, as shown in FIG. 2. One end of the flexible printed circuit board 19 is connected with the printed circuit board 17, while the other end is connected with a connector 20, as shown in FIG. 2. The connector 20 is connected with a connector 31 mounted on the printed circuit board 5. The printed circuit board 17 is contained in a reflector 18, as shown in FIG. 2.

The reflector 18 is made of, e.g., resin material or the like and reflects, from a reflecting surface 18b, light of the light emitting diodes 16 to the liquid crystal panel 14. Thus, the light can be effectively used. The liquid crystal panel 14 is attached to the reflector 18, as shown in FIG. 2. The reflector 18 includes an attachment portion 18a. The attachment portion 18a functions as a supporting portion to attach the center panel 13 to the pointer instrument or the speedometer A.

The attachment portion 18a is integrated to the reflector 18 with a resin molding so as to extend from a rear side of the reflector 18 towards the dial plate 2 (leftward in FIG. 2). The attachment portion 18a passes through a through-hole 2d of the dial plate 2 to touch the printed circuit board 5 and is screw to the printed circuit board 5 with a male screw. The attachment portion 18a includes a tunnel portion 18c so that the printed circuit board 5 and the printed circuit board 17 can communicate with each other. The above-mentioned flexible printed circuit board 19 is inserted through the tunnel portion 18c, as shown in FIG. 2.

The attachment portion 18a is disposed, in the viewing direction (horizontal direction in FIG. 2), inside the outer circumference of the center panel 13 and outside an angle range θ of the rotating angle of the pointer 8, as shown in FIG. 3. Thus, the attachment portion 18a is concealed by the reflector 18 to be not seen from the driver. The center panel 13 looks floating separately from the speedometer A. At the same time, the rotating pointer 8 does not touch the attachment portion 18a, so the pointer 8 is not prevented from smoothly rotating.

A cosmetic plate 15 is disposed to cover a portion of the outer circumference of the liquid crystal panel 14 and a peripheral side wall of the reflector 18, as shown in FIG. 2. Thus, the liquid crystal panel 14 can be seen via an aperture 15a of the cosmetic plate 15. The cosmetic plate 15 is formed of, e.g., resin material or metal material including aluminum and improves the cosmetic appearance of the center panel 13. The cosmetic plate 15 is circular, as shown in FIG. 1, and coaxial with the pointer shaft 7. The diameter of the cosmetic plate 15 is determined such that the viewer can apparently see the speedometer A (the tip portion of the pointer 8 and the display design on the dial plate 2 including the scales 23, characters 24, and numerals 25) outside of the outer circumference of the cosmetic plate 15 or center panel 13.

Next, the electrical circuit of the combination meter 1 of the first embodiment will be explained with reference to FIG. 4.

The controller 9 of the combination meter 1 receives power supply from a battery 34 and connects with an ignition switch 33 to detect ON/OFF of the ignition switch 33.

The controller 9 further connects with various sensors to receive detection signals from the sensors and connects with various display-related units to drive them.

These sensors include a speed sensor 35 that detects a traveling speed of the vehicle, a door sensor 36 to 39 that detect half-shut states of the doors. Here, the half-shut state is that the door is not in the normal closed state, namely, that the locking mechanism is not completely in the lock position. The door sensors 36 to 39 correspond to a driver's seat, an assistant-driver's seat, a right rear seat, and a left rear seat, respectively.

The display-related units include the light emitting diodes 3, 4, the movement 6, the liquid crystal panel 14, and the light emitting diode 16 as the backlight.

The speedometer A and the distance meter B are displayed based on the detection signals from the speed sensor 35. The door indicator C is activated based on the detection signals from the door sensors 36 to 39.

Next, the operations of the combination meter 1 of the first embodiment will be explained below.

(1) When Ignition Switch Tuned ON

When the ignition switch 33 is turned ON, the controller 9 detects it to thereby light up the light emitting diodes 3, 4 and the light emitting diode 16. The dial plate 2 and the pointer 8 of the speedometer A are thereby luminiferously displayed, and the liquid crystal panel 14 or the like is transparently illuminated.

Further, the controller 9 drives the movement 6 based on the detection signal from the speed sensor 35 to rotate the pointer shaft 7 by a given angle corresponding to the traveling speed of the vehicle. Furthermore, the controller 9 drives the liquid crystal panel 14 to display the traveling distance on the distance meter B and also update displayed data based on the detection signal from the speed sensor 35. Yet further, the controller 9 drives the liquid crystal panel 14 to display the closing state of each door on the door indicator C based on the detection signal from the door sensors 36 to 39.

(2) When Ignition Switch Turned OFF

When the ignition switch 33 is turned OFF, the controller 9 detects it to thereby light off the light emitting diodes 3, 4 and the light emitting diode 16.

Further, the controller 9 stops driving of the movement 6 and the liquid crystal panel 14.

As explained above, in the combination meter 1 according to the first embodiment, the center panel 13 is closer to the viewer than the speedometer A is and overlapped with the speedometer A, in the viewing direction. The attachment portion 18a is included to extend from the rear side of the center panel 13 towards the dial plate 2 of the speedometer A and to fix the center panel 13 to the printed circuit board 5 of the speedometer A.

Under this structure, the viewer cannot see the attachment portion 18a that is concealed rearward of the center panel 13.

This allows the center panel 13 to look floating separately from the speedometer A towards the viewpoint of the viewer, and provides the combination meter 1 having excellent visibility and aesthetic cosmetic appearance.

In the combination meter 1 according to the first embodiment, the center panel 13 has a circular shape, which is coaxial with the pointer shaft 7 of the speedometer A.

Thus, the center panel 13, and the scales 23 and numerals 25 of the speedometer A arranged in circular arcs can be coaxially seen as similar shapes. In other words, the viewer can notice that the combination meter 1 maintains uniformity in the cosmetic design. Thus, the combination meter 1 can provide aesthetic cosmetic appearance.

Second Embodiment

Figure 5:
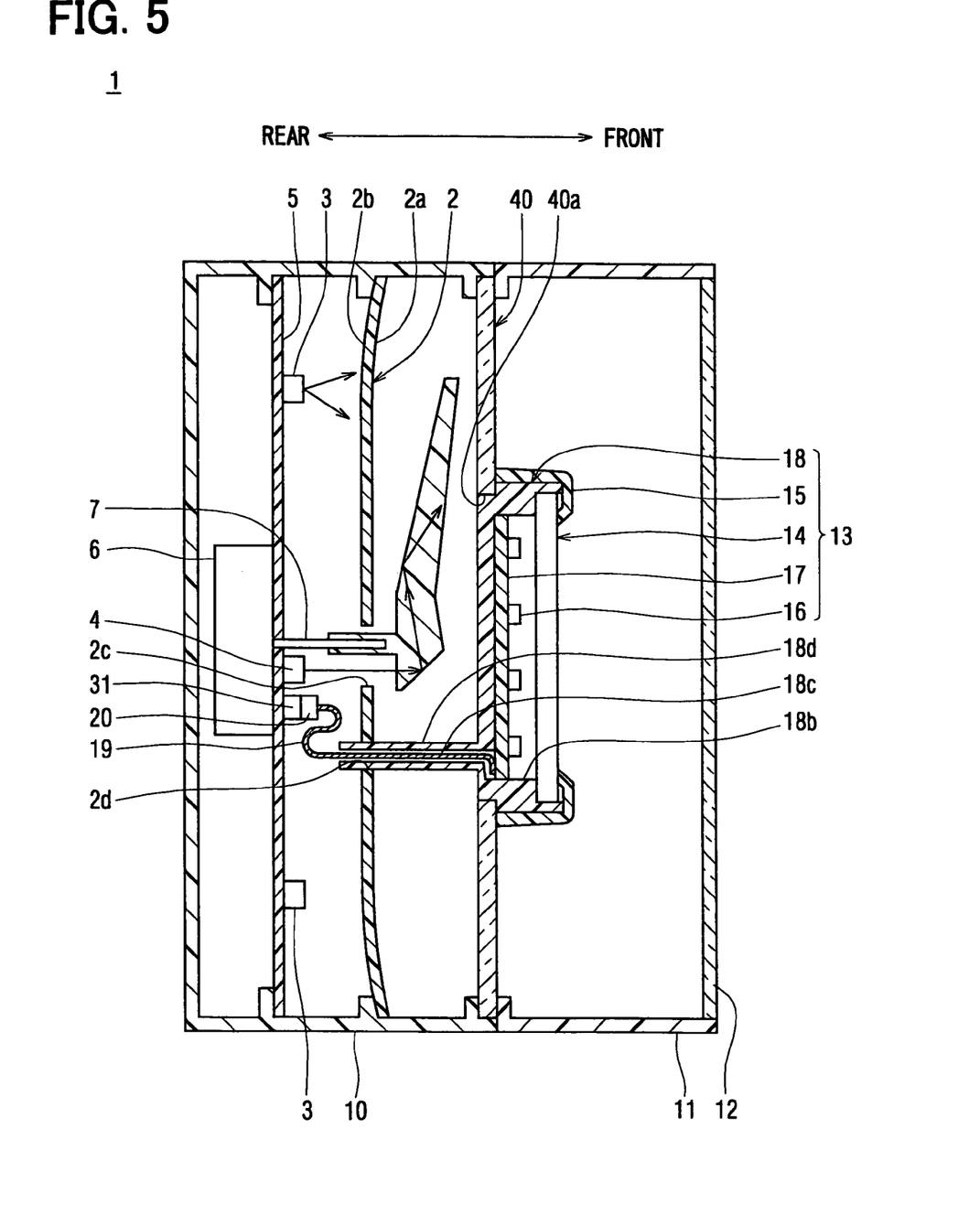
FIG. 5 is a cross-sectional view of a combination meter according to a second embodiment.

FIG. 5 is a cross-sectional view of a combination meter 1 according to a second embodiment and corresponds to the cross-sectional view taken from line II-II in FIG. 1.

The combination meter 1 according to the second embodiment is different from that of the first embodiment in a fixation of a center panel 13 to a speedometer A.

As shown in FIG. 5, a support plate 40 is provided as a supporting unit to support and fix the center panel 13. The support plate 40 is formed of translucent material, e.g., transparent polycarbonate resin plate. The support plate 40 is closer (rightward in FIG. 5) to the viewer in a viewing direction (horizontal direction in FIG. 5) than the speedometer A or pointer 8 is. In detail, a reflector 18 fits in an engaging aperture 40a provided in the support plate 40.

The reflector 18 has a guide portion 18d substituting the attachment portion 18a of the first embodiment, as shown in FIG. 5. The guide portion 18d includes a tunnel portion 18c, which contains a flexible printed circuit board 19 and prevents the potentially bent flexible printed circuit board 19 from appearing. Thus, the dial plate-side end of the guide portion 18d is disposed to pass through a through-hole 2d of a dial plate 2 and protrude towards a printed circuit board 5 without touching the printed circuit board 5, as shown in FIG. 5.

In the combination meter 1 of the second embodiment, the positional relationship between the center panel 13 and speedometer A is similar to that of the first embodiment; the center axis of the circular center panel 13 is the same as that of a pointer shaft 7 of the speedometer A.

The combination meter 1 according to the second embodiment can provide the same effect as that of the first embodiment does. The center panel 13 looks floating separately from the speedometer A towards the viewer. This provides the combination meter 1 having excellent visibility and aesthetic cosmetic appearance. The center panel 13, and scales 23 and numerals 25 of the speedometer A arranged in circular arcs can be coaxially seen as similar shapes. The viewer can notice that the combination meter 1 maintains uniformity in the cosmetic design.

Third Embodiment

Figure 6:
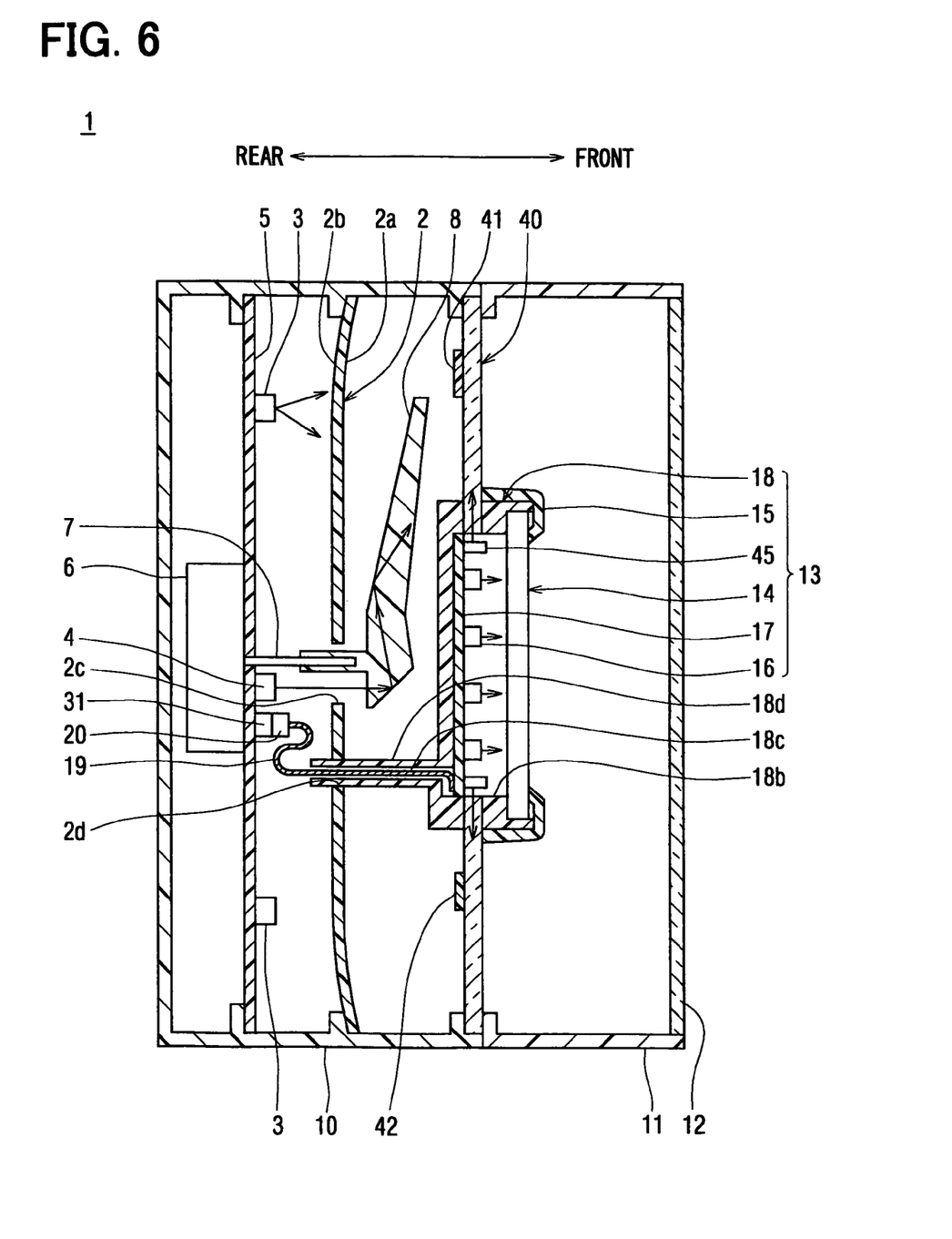
FIG. 6 is a cross-sectional view of a combination meter according to a third embodiment.

FIG. 6 is a cross-sectional view of a combination meter 1 according to a third embodiment and corresponds to the cross-sectional view taken from line II-II in FIG. 1.

The combination meter 1 according to the third embodiment is different from that of the second embodiment in a structure of a support plate 40. The characters 24 and numerals 25 of the display design in the speedometer A are formed on a support plate 40

As shown in FIG. 6, characters 41 and numerals 42 are formed on a rear surface 40b of the support plate 40 by forming a non-translucent colored layer or semi-translucent colored layer using printing or hot-stamping.

Furthermore, a light emitting diode 45 is mounted on a printed circuit board 17 of a center panel 13 as a light source to illuminate the characters 41 and numerals 42, as shown in FIG. 6.

The combination meter 1 according to the third embodiment can provide the same effect as that of the first embodiment can. The center panel 13 looks floating separately from a speedometer A towards the viewer. This provides the combination meter 1 having excellent visibility and aesthetic cosmetic appearance. The center panel 13 and the scales 23 and numerals 42 of the speedometer A arranged in circular arcs can be coaxially seen as similar shapes. The viewer can notice that the combination meter 1 maintains uniformity in the cosmetic design.

Furthermore, the characters 41 and numerals 42 of the speedometer A look floating towards the viewer with respect to the scales 23 on the dial plate 2, which enables the cosmetic appearance of the speedometer A to look three-dimensional.

In the combination meter 1 according to the third embodiment, the characters 41 and numerals 42 are formed on the support plate 40; however, without limiting, the characters 24 and numerals 25 are formed on the dial plate 2 while the scale 23 can be formed on the support plate 40. Alternatively, all the scales 23, characters 24, and numerals 25 can be formed on the support plate 40.

Fourth Embodiment

Figure 7:
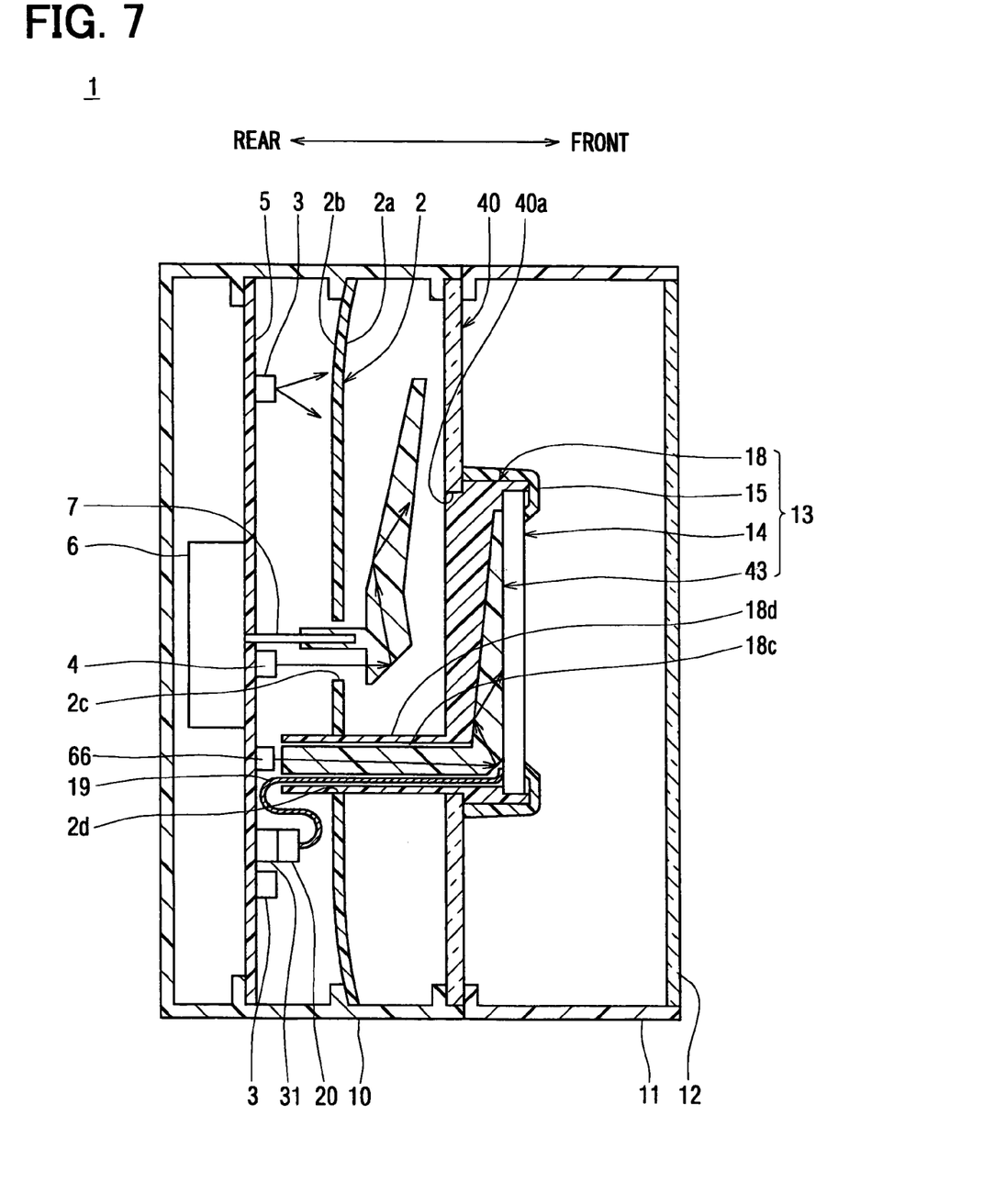
FIG. 7 is a cross-sectional view of a combination meter according to a fourth embodiment.

FIG. 7 is a cross-sectional view of a combination meter 1 according to a fourth embodiment and corresponds to the cross-sectional view taken from line II-II in FIG. 1.

The combination meter 1 according to the fourth embodiment is different from that of the second embodiment in a location of a light emitting diode 66 for illuminating a liquid crystal panel 14.

The light emitting diode is moved on a printed circuit board 5 rearward of a dial plate 2, not on the printed circuit board 17 rearward of the liquid crystal panel 14 of a center panel 13. As shown in FIG. 7, a conductive member 43 is newly provided to guide the light emitted by the light emitting diode 66 towards the liquid crystal panel 14.

With the light emitting diode 66 moved, the printed circuit board 17 is eliminated. Thus, of the flexible printed circuit board 19, the end facing the center panel 13 is connected with the liquid crystal panel 14.

The combination meter 1 according to the fourth embodiment can provide the same effect as that of the first embodiment can. The center panel 13 looks floating separately from the speedometer A towards the viewer. This provides the combination meter 1 having excellent visibility and aesthetic cosmetic appearance. The center panel 13 and the scales 23 and numerals 42 of the speedometer A arranged in circular arcs can be coaxially seen as similar shapes. The viewer can notice that the combination meter 1 maintains uniformity in the cosmetic design.

Furthermore, a structure of transparently illuminating the liquid crystal panel 14 in the combination meter 1 according to the fourth embodiment can be adapted to the combination meter 1 according to the first embodiment.

Fifth Embodiment

In the display device according to the above embodiments, the displaying unit is disposed in front of the pointer instrument to overlap with the pointer instrument in the viewing direction from the viewer. To secure the visibility of the pointer, the space for the displaying unit is naturally limited.

The displaying unit is, e.g., a liquid crystal indicator that typically includes a peripheral component such as a connector used for inputting electrical signals that activates the liquid crystal. This peripheral component is disposed separately from a displaying screen of the liquid crystal indicator that actually displays information.

Because the liquid crystal indicator with the peripheral component is disposed within the above limited space, the size of the displaying screen of the liquid crystal indicator may be too small to provide a good visibility.

Here, the displaying screen can be achieved to have a large area by differently designing a shape of the connector; however, this would increase costs of the liquid crystal indicator.

Figure 8:
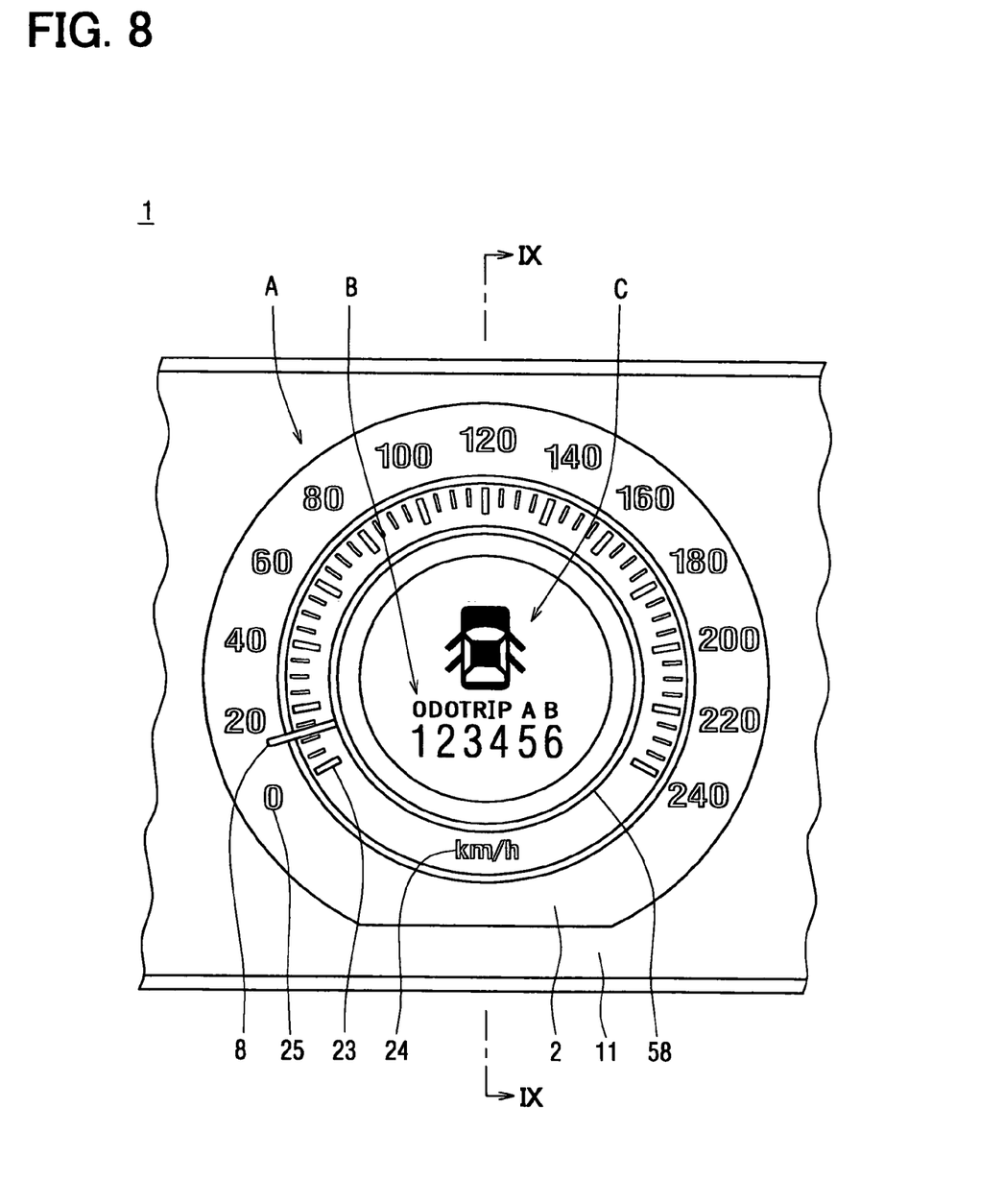
FIG. 8 is a partial front view of a combination meter according to a fifth embodiment.

A fifth embodiment has a feature to improve the above. FIG. 8 shows a front view of a combination meter 1 according to the fifth embodiment. Here, a display image of a liquid crystal panel 53 is shown as a magnified virtual image or practically visible image.

Figure 9:
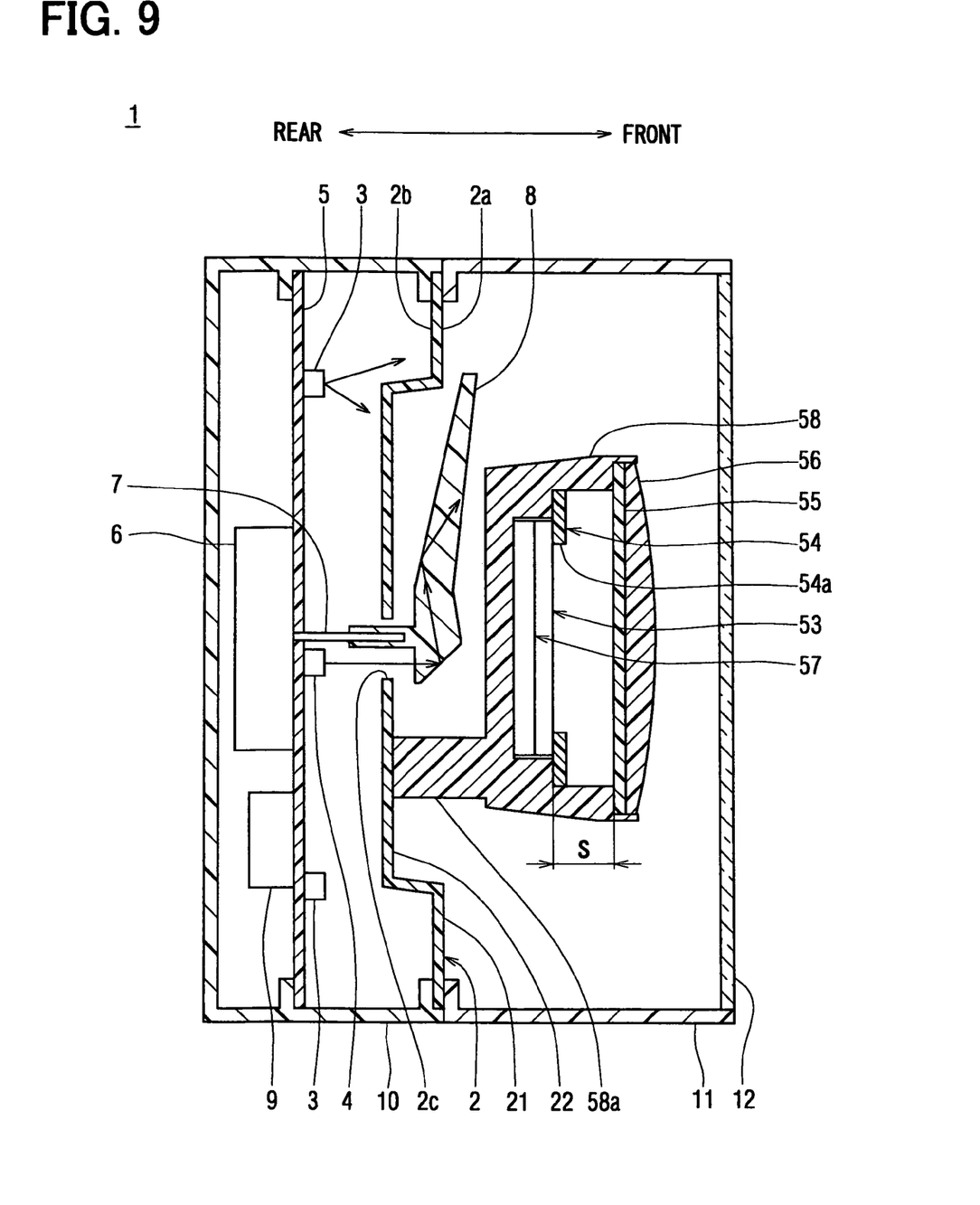
FIG. 9 is a cross-sectional view taken from line IX-IX in FIG. 8 according to the fifth embodiment.
Figure 10:
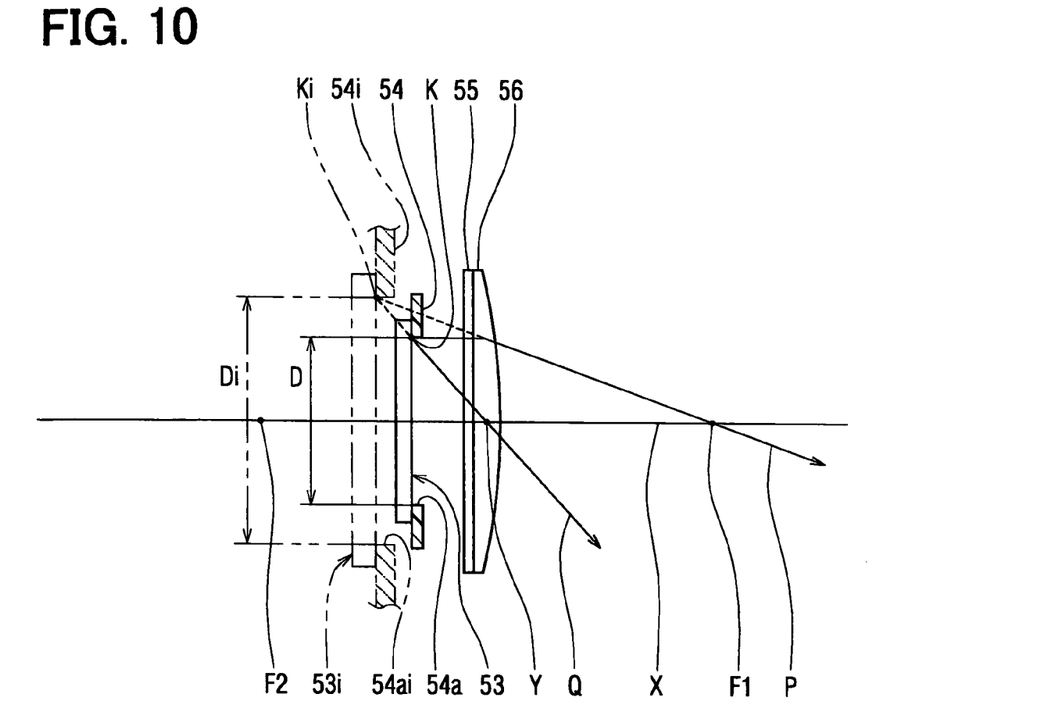
FIG. 10 is a view illustrating a display image of a liquid crystal panel and a magnified virtual image in the combination meter according to the fifth embodiment.
Figure 11:
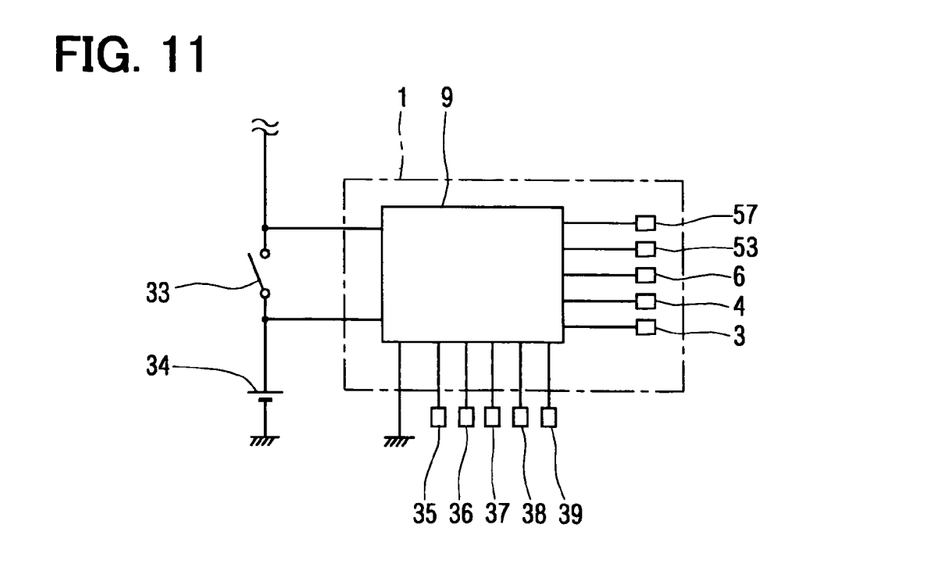
FIG. 11 is a diagram illustrating a structure of an electrical circuit of the combination meter according to the fifth embodiment.

FIG. 9 is a cross-sectional view taken from line IX-IX in FIG. 8. Here, the right side of FIG. 9 faces a driver's seat, so the combination meter 1 is seen from the right side. FIG. 10 explains a relation between an actual shape and a size of the magnified virtual image with respect to the liquid crystal panel 53 in the combination meter 1. FIG. 11 illustrates a schematic structure of an electrical circuit of the combination meter 1.

The combination meter 1 is mounted in a vehicle for a driver to able to see it in front of the driver's seat. The combination meter 1 displays a variety of information relating to the vehicle. The combination meter 1 includes a speedometer A that indicates a traveling speed of the vehicle, a distance meter B that indicates an accumulated traveling distance and an interval traveling distance, and a door indicator C that indicates opening and closing states of the doors of the vehicle.

The speedometer A will be explained below.

The speedometer A is a pointer instrument that indicates a speed by a rotational angle of a pointer 8. The speedometer A includes a dial plate 2 to enable the driver to recognize the rotational position of the pointer 8.

The dial plate 2 is formed of translucent material such as a clear thin plate made of polycarbonate. The dial plate 2 has a two-step structure to include a central concave bottom portion 22 and a peripheral portion 21, as shown in FIG. 9. The bottom portion 22 is formed coaxially with a movement 6 and a pointer shaft 7. The bottom portion 22 includes a display design of scales 23 and characters 24; the peripheral portion 21 includes a display design of numerals 25. The scales 23 and numerals 25 indicate the vehicle speed using the pointer 8, and are disposed coaxially with the pointer shaft 7 in individual circular arcs. The scales 23, the characters 24, and the numerals 25 are formed by printing or hot-stamping either on a front surface 2a (right-side surface in FIG. 9) or on a rear surface 2b (left-side surface in FIG. 9) of the dial plate 2. Non-translucent or semi-translucent colorant is applied to areas other than the scales 23, characters 24, and numerals 25, while semi-translucent colorant or no colorant is applied to the scales 23, characters 24, and numerals 25. In the fifth embodiment, semi-translucent yellow colorant is applied to the scales 23, characters 24, and numerals 25; semi-translucent dark blue colorant is applied to other areas. Under this coloring structure, light emitting diodes 3 located backward of the dial plate 2 transparently illuminate the dial plate 2 to luminiferously indicate the scales 23, characters 24, and numerals 25 in yellow within the dark-blue background.

The dial plate 2 includes a through-hole 2c as shown in FIG. 9. This through-hole 2c is used for the pointer shaft 7 of the movement 6 to protrude the dial plate 2 from the rear side (left side in FIG. 9) to the front side (right side in FIG. 9).

A printed circuit board 5 is disposed rearward (leftward in FIG. 9) of the dial plate 2. The printed circuit board 5 is a glass-epoxy board or the like to constitute an electrical circuit of the combination meter 1.

The light emitting diodes 3 and light emitting diode 4 are mounted on the printed circuit board 5 for transparently illuminating the dial plate 2 and the pointer 8, respectively. In this embodiment, the light emitting diodes 3, 4 are white light emitting diodes.

Further, the movement 6 is mounted on the printed circuit board 5. The movement 6 is a stepping motor or an electric actuator such as a cross-coil rotating machine to rotate the pointer shaft 7 by an angle corresponding to an electrical signal from outside (in this embodiment, a signal of the vehicle speed). The pointer shaft 7 of the movement 6 protruding frontward of the dial plate 2 fixes the pointer 8 in its tip end. The pointer 8 is formed of translucent material such as acrylic resin such that the pointer 8 is luminiferously displayed by lights from the light emitting diode 4 mounted on the printed circuit board 5.

Further, a controller 9 is mounted on the printed circuit board 5 to control lighting up or off of the light emitting diodes 3, 4 and driving of the movement 6. The controller 9 is a CPU or the like.

The above-described dial plate 2, the printed circuit board 5, or the like are contained within a casing 10 made of resin material, as shown in FIG. 9.

A rim plate 11 having a frame shape is disposed frontward of the dial plate 2; further, a clear cover 12 is attached to the front end of the rim plate 11. For instance, the rim plate 11 is formed of resin material; the clear cover 12 is formed of a clear resin thin plate or glass. The rim plate 11 and the clear cover 12 prevent moisture or dust from entering inside of the combination meter 1.

Next, the distance meter B and the door indicator C will be explained below.

These are formed as display images over the liquid crystal panel 53 functioning as a displaying unit. The liquid crystal panel 53 is disposed to be seen in a central inward area of the speedometer A from the viewpoint of the driver (right side in FIG. 9). The liquid crystal panel 53 and the speedometer A are seen to overlap with each other in the viewing direction (horizontal direction in FIG. 9).

A cosmetic plate 54 is attached to a peripheral portion of a front surface of the liquid crystal panel 53, as shown in FIG. 9. The cosmetic plate 54 is a marginal plate to have an aperture 54a. The aperture 54a is circular and has a smaller diameter than the liquid crystal panel 53 to be seen as a circumferential border of the distance meter B and the door indicator C.

A Fresnel lens 55 and convex lens 56, as an optical magnifying unit, are disposed to oppose the liquid crystal panel 53 via the cosmetic plate 54 (rightward of the cosmetic plate 54 in FIG. 9). The Fresnel lens 55 is closer to the liquid crystal panel 53 than the convex lens 56 is. Both lenses 55, 56 are formed of resin material or glass and laminated to closely contact each other. Both the lenses 55, 56 have larger diameters than the aperture 54a does, so that the outer circumferences of both the lenses 55, 56 are outside the outer circumference of the aperture 54a, as shown in FIG. 9. A given space S is formed between the liquid crystal panel 53 and the Fresnel lens 55.

A backlight 57 is disposed rearward (leftward in FIG. 9) of the liquid crystal panel 53 for translucently illuminating the liquid crystal panel 53. The backlight 57 has the same planar shape as that of the liquid crystal panel 53 to emit light in a uniform luminance from the entire surface.

The liquid crystal panel 53, the cosmetic plate 54, the Fresnel lens 55, and the convex lens 56, which constitute the distance meter B and the door indicator C, are contained within a holder 58, as shown in FIG. 9. The holder 58 is formed of resin material to have a circular planar shape while enabling the scales 23 of the dial plate 2 to be visible outside the outer circumference of the holder 58, as shown in FIG. 8.

The holder 58 is fixed to the dial plate 2 of the speedometer A via an attachment portion 58a. The holder 58 is disposed coaxially with the scales 23, the characters 24, and the numerals 25 of the display design of the dial plate 2, i.e., coaxially with the pointer shaft 7 so as not to prevent the pointer 8 from rotating.

Further, the liquid crystal panel 53 and the backlight 57 electrically connect with the printed circuit board 5 via a conductive member (not shown).

Next, functions of the Fresnel lens 55 and the convex lens 56, in particular, effects on the visibility of the liquid crystal panel 53 will be explained with reference to FIG. 10. These are features of the combination meter 1 according to this embodiment.

In FIG. 10, to easily explain, other components excluding the liquid crystal panel 53, the cosmetic plate 54, the Fresnel lens 55, and the convex lens 56 are eliminated. Both lenses 55, 56 as a combined lens are disposed to have the same lens axis X, the lens center of the combined lens Y, and focuses F1, F2 of the combined lens in FIG. 10. Further, FIG. 10 is drawn with respect to a light from an intersecting point K that is the most outward point of the visible area within the liquid crystal panel 53 (or the point where the liquid crystal panel 53 and the outer circumference of the aperture 54a intersect).

In the combination meter 1 of this embodiment, the liquid crystal panel 53 is disposed between the two focuses F1, F2. Here, a light P is to advance from the point K parallel with the lens axis X to the combined lens 55, 56 and then advance to the focus F1; a light Q is to advance from the point K to the lens center Y The lights P, Q do not intersect in the F1 side with respect to the combined lens 55, 56 as shown in FIG. 10. Therefore, no real image of the intersecting point K appears in the F1 side, but a virtual image Ki of the intersecting point K appears in the F2 side with respect to the combined lens 55, 56, or in the side opposite to the advancing side, as shown in FIG. 10.

Namely, the virtual image 53$i$ of the liquid crystal panel 53 and the virtual image 54$ai$ of the outer circumference of the aperture 54$a$ appear, so that the driver can see these virtual images 53$i$, 54$ai$. The diameter Di of the virtual image 54$ai$ is longer than the diameter D of the actual outer circumference of the aperture 54$a$.

Thus, the driver sees the liquid crystal panel 53 surrounded by the outer circumference of the aperture 54$a$ as the magnified virtual image 53$i$ surrounded by the virtual image 54$ai$.

Namely, the image of the liquid crystal panel 53 is magnified to thereby enhance the visibility of the liquid crystal panel 53.

Here, a magnification ratio E (=Di/D) of the combined lens 55, 56 is set to approximately 1.4. However, the ratio E can be changed as a design factor, without limiting to 1.4, by at least one of the space S and the focuses F of the Fresnel lens 55 and the convex lens 56.

Next, the electrical circuit of the combination meter 1 will be explained with reference to FIG. 11.

The controller 9 of the combination meter 1 receives power supply from a battery 34 and connects with an ignition switch 33 to detect ON/OFF of the ignition switch 33.

The controller 9 further connects with various sensors to receive detection signals from the sensors and connects with various display-related units to drive them.

These sensors include a speed sensor 35 that detects a traveling speed of the vehicle, a door sensor 36 to 39 that detect half-shut states of the doors. Here, the half-shut state is that the door is not in the normal closed state, namely, that the locking mechanism is not completely in the lock position. The door sensors 36 to 39 correspond to a driver's seat, an assistant-driver's seat, a right rear seat, and a left rear seat, respectively.

The display-related units include the light emitting diodes 3, 4, the movement 6, the liquid crystal panel 53, and the backlight 57.

The speedometer A and the distance meter B are displayed based on the detection signals from the speed sensor 35. The door indicator C is activated based on the detection signals from the door sensors 36 to 39.

Next, the operations of the combination meter 1 will be explained below.

(1) When Ignition Switch Tuned ON

When the ignition switch 33 is turned ON, the controller 9 detects it to thereby light up the light emitting diodes 3, 4 and the backlight 57. The dial plate 2 and the pointer 8 of the speedometer A are thereby luminiferously displayed, and the liquid crystal panel 53 or the like is illuminated.

Further, the controller 9 drives the movement 6 based on the detection signal from the speed sensor 35 to rotate the pointer shaft 7 by a given angle corresponding to the traveling speed of the vehicle. Furthermore, the controller 9 drives the liquid crystal panel 53 to display the traveling distance on the distance meter B and also update displayed data based on the detection signal from the speed sensor 35. Yet further, the controller 9 drives the liquid crystal panel 53 to display the closing state of each door on the door indicator C based on the detection signal from the door sensors 36 to 39.

(2) When Ignition Switch Turned OFF

When the ignition switch 33 is turned OFF, the controller 9 detects it to thereby light off the light emitting diodes 3, 4 and the backlight 57. Further, the controller 9 stops driving of the movement 6 and the liquid crystal panel 53.

As explained above, in the combination meter 1 according to the fifth embodiment, the cosmetic plate 54 having the aperture 54$a$ is disposed in front of the liquid crystal panel 53 to thereby enable a viewer to able to see the liquid crystal panel 53 via the aperture 54$a$. Further, the Fresnel lens 55 and the convex lens 56 are disposed in front of the cosmetic plate 54; namely, the Fresnel lens 55 and the convex lens 56 are disposed oppositely to the liquid crystal panel 53 with respect to the cosmetic plate 54. The outer circumferences of the Fresnel lens 55 and the convex lens 56 are located outside the outer circumference of the aperture 54$a$.

Further, the speedometer A of the pointer instrument is disposed rearward of the liquid crystal panel 53 so that the scales 23, the characters 24, the numerals 25, and the tip portion of the pointer 8 can be seen outside the cosmetic plate 54.

Thus, the driver can see the area of the liquid crystal panel 53 surrounded by the outer circumference of the aperture 54$a$ as the virtual image 53$i$ surrounded by the virtual image 54$ai$ of the outer circumference of the aperture, both of the virtual images 53$i$, 54$ai$ are magnified from the actual sizes.

In a conventional vehicular display device, a liquid crystal panel is closer to the viewer in the viewing direction than a pointer instrument is, so the liquid crystal panel and the pointer instrument are overlapped with each other to thereby limit the space between them. Therefore, a small-sized liquid crystal panel needs to be used for this limited space. Consequently, a display image on the liquid crystal panel becomes small to thereby degrade the visibility of the liquid crystal panel.

In contrast, in the combination meter 1 of the fifth embodiment, the Fresnel lens 55 and the convex lens 56 as the optical magnifying unit are disposed in front (or in the viewer side) of the liquid crystal panel 53, so that the driver or viewer practically sees the magnified virtual image 53$i$ surrounded by the virtual image 54$ai$ corresponding to a portion area of the liquid crystal panel 53 surrounded by the outer circumference of the aperture 54$a$.

Under the above structure, the compact liquid crystal panel 53 can be mounted within the combination meter 1 to decrease the cost, and the combination meter 1 can provide aesthetic cosmetic appearance and excellent visibility Further, the shapes of the cosmetic plate 54 and the aperture 54$a$ are circular similarly to standard arrangements of the scales 23, the characters 24, and the numerals 25 of the display design of the speedometer A that is seen outside the liquid crystal panel 53. Further, the cosmetic plate 54 and the aperture 54$a$ are disposes coaxially with the arrangements of the scales 23, the characters 24, and the numerals 25 of the speedometer A, i.e., coaxially with the pointer shaft 7.

Thus, the display design of the liquid crystal panel 53 and the display design of the speedometer A are assimilated with each other to thereby enhance the uniformity in the display design of the combination meter 1. This achieves a combination meter 1 that excels in the cosmetic design to provide aesthetic cosmetic appearance.

Further, the combined lens as the optical magnifying unit can be formed of not only a combination of the Fresnel lens 55 and the convex lens 56 but also a combination of two Fresnel lenses 55 or a combination of two convex lenses 56.

Sixth Embodiment

Figure 12:
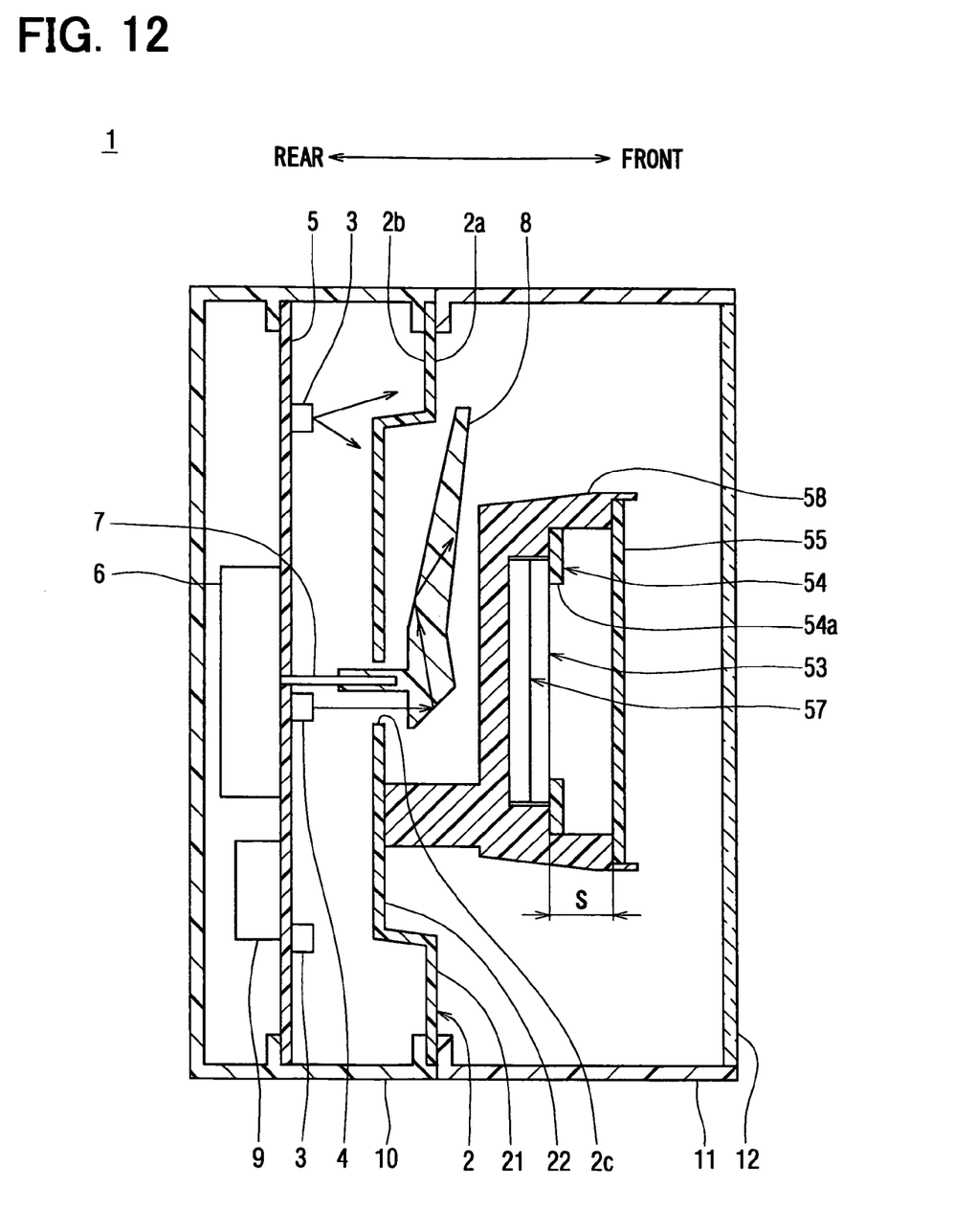
FIG. 12 is a cross-sectional view of the combination meter according to a sixth embodiment.

FIG. 12 shows a cross-sectional view (comparable with the cross-sectional view taken from line IX-IX in FIG. 8) of a combination meter 1 according to a sixth embodiment of the present invention.

In the sixth embodiment, the optical magnifying unit is different from that of the fifth embodiment. The optical magnifying unit is formed of only the Fresnel lens 55.

This structure can provide the same effect as that in the fifth embodiment and decrease the number of components by including only one lens.

In the sixth embodiment, a single Fresnel lens 55 is used as an optical magnifying unit; however, it can be replaced by a single convex lens 56.

In the combination meter 1 explained in the fifth and sixth embodiments, the aperture 54a of the cosmetic plate 54 is circular; however, not limited to being circular, it can be elliptic, polygonal, or the like.

Others

In the above embodiments, the combination meter 1 includes the speedometer A as the pointer instrument; however, other pointer instruments such as a tachometer indicating an engine rotation speed can be substituted.

In the above embodiments, the liquid crystal panel 53 indicates the distance meter B and the door indicator C; however, other information such as a vehicle-interior temperature, an vehicle-outside temperature, an engine coolant temperature, a fuel amount remaining in a fuel tank, a battery voltage, or the like can be added or substituted.

In the above embodiments, the combination meter 1 includes only one pointer instrument; however, an additional pointer instrument can be included. Here, the pointer instruments can be assembled with the respective liquid crystal panels disposed in front of themselves to be seen from the viewer.

In the above embodiments, the combination meter 1 includes the light emitting diodes 3, 4, 16, 66 as light sources; however, all or any one of the light emitting diodes 3, 4, 16, 66 can be replaced by an electrical bulb or a discharge lump.

It will be obvious to those skilled in the art that various changes may be made in the above-described embodiments of the present invention. However, the scope of the present invention should be determined by the following claims.

What is claimed is:

1. A vehicular display device comprising:
 a pointer instrument including
  a dial plate having a display design and
  a pointer that rotates over the dial plate; and
 a displaying unit closer to a viewer than the pointer instrument is in a viewing direction and overlapped with the pointer instrument, wherein a portion of the pointer of the pointer instrument and the display design are visible outside of the displaying unit,
 wherein the displaying unit includes
  a light source and
  a supporting portion, which extends towards the pointer instrument rearward of the displaying unit, and
 wherein the displaying unit is supported and fixed to the pointer instrument via the supporting portion.

2. The vehicular display device of claim 1,
 wherein an outer circumference of the displaying unit is approximately circular.

3. The vehicular display device of claim 1,
 wherein a center axis of the outer circumference of the displaying unit and a pointer shaft of the pointer are disposed coaxially.

4. The vehicular display device of claim 1,
 wherein the displaying unit includes a liquid crystal indicator.

5. The vehicular display device of claim 1, further comprising:
 a marginal plate that has an aperture provided in front of the displaying unit, wherein the viewer sees the displaying unit through the aperture; and
 an optical magnifying unit that is provided to oppose the pointer instrument via the marginal plate, wherein an outer circumference of the optical magnifying unit is outside an outer circumference of the aperture.

6. The vehicular display device of claim 5,
 wherein the outer circumference of the aperture is visible via the optical magnifying unit.

7. The vehicular display device of claim 5,
 wherein the aperture is circular, and the display design of the pointer instrument is disposed in a circular arc.

8. A vehicular display device comprising:
 a pointer instrument including
  a dial plate having a display design and
  a pointer that rotates over the dial plate;
 a displaying unit closer to a viewer than the pointer instrument is in a viewing direction and overlapped with the pointer instrument, wherein the displaying unit includes a light source, wherein a portion of the pointer of the pointer instrument and the display design are visible outside of the displaying unit; and
 a supporting unit formed of translucent material to be closer to the viewer in the viewing direction than the dial plate is,
 wherein the displaying unit is supported and fixed to the pointer instrument via the supporting unit.

9. The vehicular display device of claim 8,
 wherein at least a part of the display design of the pointer instrument is formed on the supporting unit.

* * * * *